United States Patent [19]

Buhrow et al.

[11] Patent Number: 4,998,208

[45] Date of Patent: Mar. 5, 1991

[54] PIPING CORROSION MONITORING SYSTEM CALCULATING RISK-LEVEL SAFETY FACTOR PRODUCING AN INSPECTION SCHEDULE

[75] Inventors: Robert P. Buhrow, Lima; Ronald J. Schuster, Strongsville; Gary G. Leininger, Solon, all of Ohio

[73] Assignee: The Standard Oil Company, Cleveland, Ohio

[21] Appl. No.: 274,729

[22] Filed: Nov. 14, 1988

Related U.S. Application Data

[63] Continuation of Ser. No. 26,406, Mar. 16, 1987, abandoned.

[51] Int. Cl.[5] .............................................. G06F 15/20

[52] U.S. Cl. .................................... 364/512; 364/507; 364/551.01

[58] Field of Search .................... 137/551; 364/551.01, 364/496, 506–509, 402, 512; 73/40, 40.5 R

[56] References Cited

U.S. PATENT DOCUMENTS

| | | | |
|---|---|---|---|
| 3,047,847 | 7/1962 | Marsh et al. | 324/65 CR |
| 4,106,099 | 8/1978 | Elliot et al. | 364/510 |
| 4,298,955 | 11/1981 | Munday et al. | 364/900 |
| 4,400,782 | 8/1983 | Ishikawa et al. | 364/550 |
| 4,656,595 | 4/1987 | Hognestad | 364/507 |
| 4,658,365 | 4/1987 | Syrett et al. | 364/496 |
| 4,707,796 | 11/1987 | Calabro et al. | 364/552 |
| 4,712,182 | 12/1987 | Wakamori et al. | 364/507 |
| 4,796,466 | 1/1989 | Farmer | 73/40.5 R |

FOREIGN PATENT DOCUMENTS

| | | | |
|---|---|---|---|
| 2161278A | 1/1986 | United Kingdom | 364/506 |

OTHER PUBLICATIONS

"Automatic, Interactive Graphic Systems Maintain Pipeline Network Maps", Computer Design/Apr. 1977, vol. 16, No. 4, pp. 58, 62, 66, 76.

Buhrow, "The Personal Computer for Corrosion Monitoring of Process Equipment," Mar. 17–21, 1986, paper #67, Corrosion 86.

Gilson, "The Piping Corrosion Monitoring System," Sep. 10, 1986, Refining Mechanical Reliability and Inspection Conference, Philadelphia.

Buhrow, R. P., "A Complete Computer Program for Inspection of Refinery Piping", Standard Oil Co., Preprint No. 09-68, May 15, 1968.

Buhrow, R. P., "The Computer Assists the Refinery Inspector: When to Inspect Piping," The Standard Oil Co., Preprint No. 35-71, May 13, 1971.

Buhrow, R. P., "Computer Forecasting Inspection Dates from Metal Corrosion Data," The American Society of Mechanical Engineers, 85-Pet-3, Feb. 17-21, 1985.

*Primary Examiner*—Parshotam S. Lall
*Assistant Examiner*—S. A. Melnick
*Attorney, Agent, or Firm*—Larry W. Evans; Joseph G. Curatolo

[57] ABSTRACT

A piping corrosion monitoring system is disclosed which is implemented by software run on a personal computer or the equivalent. The system generates inspection dates for individual piping and other elements, such as pressure vessels, in a process plant. The process plant is divided into circuits made up of piping and associated vessels expected to be exposed to a common corrosion environment. Corrosion data for individual inspection points within each circuit is used to estimate likely corrosion rates for other elements of the particular circuit. The estimated corrosion rates are used to calculate inspection dates for elements within the circuits. Also factored into the inspection date are the risk factors such as the toxicity of the substance being carried, the proximity of the circuit to valuable property or to control rooms, laboratories, or the like, and other factors relating to the security assigned to the circuit. The system evaluates a large number of possible corrosion mechanisms for each inspection point and chooses that which leads to the highest anticipated corrosion rate in calculation of the inspection date, thus providing a very conservative inspection date schedule, while not overinspecting circuits likely to exhibit low corrosion rates or in which failure would be relatively less critical.

15 Claims, 9 Drawing Sheets

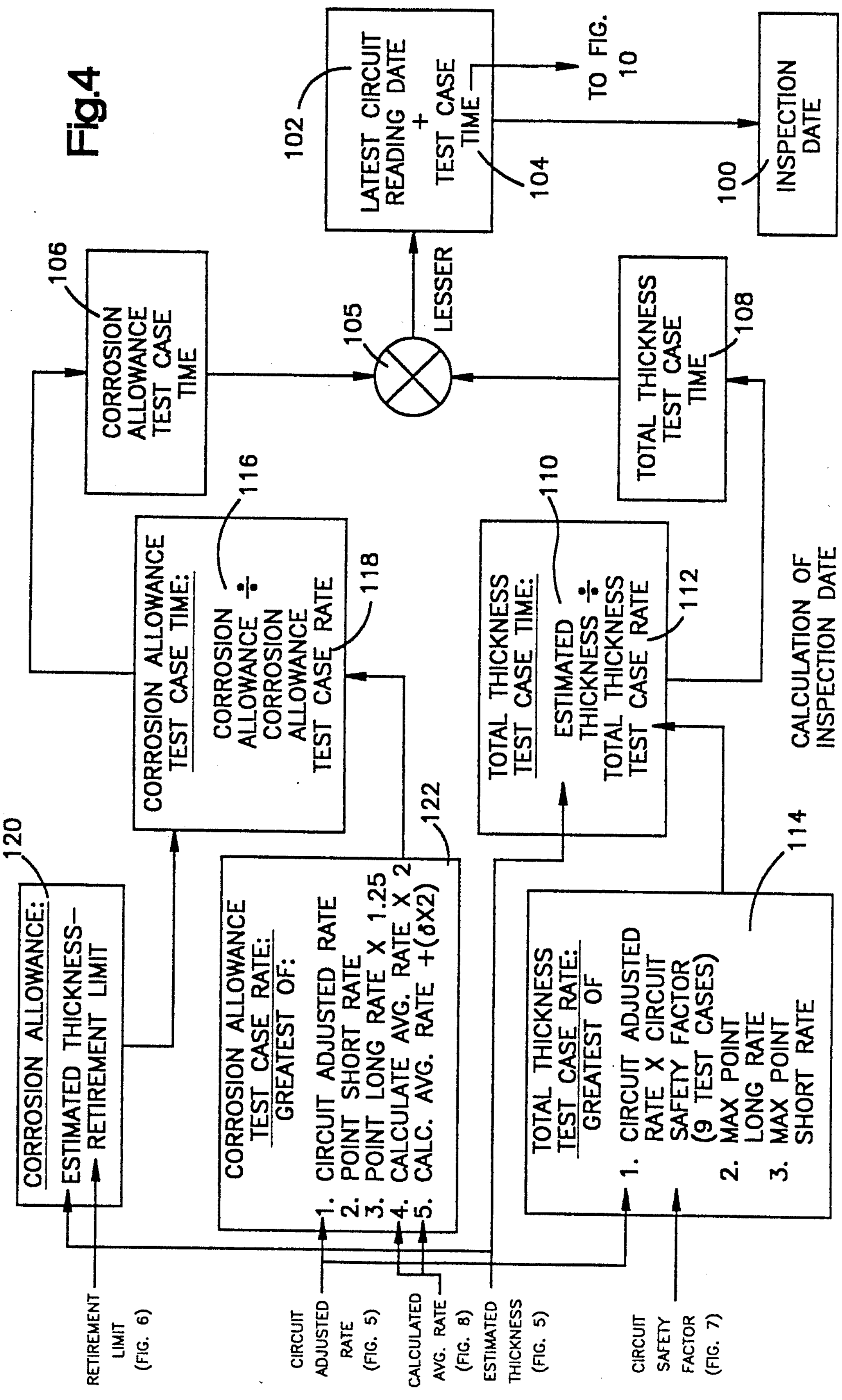
Fig.4
LATEST CIRCUIT READING DATE + TEST CASE TIME
102
104
TO FIG. 10
INSPECTION DATE
100
CORROSION ALLOWANCE TEST CASE TIME
106
105
LESSER
TOTAL THICKNESS TEST CASE TIME
108
CORROSION ALLOWANCE TEST CASE TIME: CORROSION ALLOWANCE ÷ CORROSION ALLOWANCE TEST CASE RATE
116
118
TOTAL THICKNESS TEST CASE TIME: ESTIMATED THICKNESS ÷ TOTAL THICKNESS TEST CASE RATE
110
112
CALCULATION OF INSPECTION DATE
CORROSION ALLOWANCE: ESTIMATED THICKNESS– RETIREMENT LIMIT
120
CORROSION ALLOWANCE TEST CASE RATE: GREATEST OF:
1. CIRCUIT ADJUSTED RATE
2. POINT SHORT RATE
3. POINT LONG RATE X 1.25
4. CALCULATE AVG. RATE X 2
5. CALC. AVG. RATE +(σX2)
122
TOTAL THICKNESS TEST CASE RATE: GREATEST OF
1. CIRCUIT ADJUSTED RATE X CIRCUIT SAFETY FACTOR (9 TEST CASES)
2. MAX POINT LONG RATE
3. MAX POINT SHORT RATE
114
RETIREMENT LIMIT (FIG. 6)
CIRCUIT ADJUSTED RATE (FIG. 5)
CALCULATED AVG. RATE (FIG. 8)
ESTIMATED THICKNESS (FIG. 5)
CIRCUIT SAFETY FACTOR (FIG. 7)

PIPING CORROSION MONITORING SYSTEM CALCULATING RISK-LEVEL SAFETY FACTOR PRODUCING AN INSPECTION SCHEDULE

This is a continuation-in-part of application Ser. No. 026,406, filed Mar. 16, 1987, now abandoned.

BACKGROUND OF THE INVENTION

1. Field of the Invention

This invention relates to piping corrosion monitoring systems. More particularly, it relates to a monitoring system that generates an inspection schedule from specified input data describing the piping system.

2. Related Art

All of the metals commonly used in piping or associated vessels in process plants, such as oil refineries, chemical processing facilities, pharmaceutical manufacturing plants, and other industrial environments, corrode with time. The rate of corrosion of a particular pipe or vessel is affected by the type of metal employed, the substance contacting the metal, the pressure and temperature within the pipe or vessel, and other complex factors. Failure of the piping or associated vessels can be expensive and dangerous, and even catastrophic. Accordingly, these and other industries have recognized for many years the necessity for monitoring the condition of piping and vessels within process plants.

In order to limit unnecessary plant shutdowns and to avoid accidents, the condition of the piping in a plant should be periodically inspected. More particularly, the piping wall thickness should be measured from time to time to determine when individual piping elements should be retired from service, that is, to determine when the extent of corrosion has caused the pipe to reach its "retirement limit."

Typical methods of monitoring piping thickness involve acoustic monitoring using ultrasonic probes or radiographic monitoring using a radioactive source and radiosensitive film. Development of ultrasonic thickness-measuring instruments and of radiographic techniques has allowed the wall thickness of piping to be monitored while the plant is operated. This allows inspectors to locate problems before they create dangerous conditions or cause unplanned shutdowns.

Unfortunately, most piping in a refinery, for example, is very difficult to reach, and is frequently insulated. This makes it difficult to use ultrasonic probes. The practice is therefore to inspect piping only at selected locations, referred to as inspection points. Ideally, these inspection points are chosen by experienced piping inspectors to be representative of the worst-case corrosion conditions within a particular section of the refinery.

It is generally understood that piping elements exposed to the same corrosion environment, that is, to the same combination of corrosion-affecting factors, will corrode in a similar way. If groups of pipes and associated vessels and the like which are exposed to the same corrosion environment are accurately grouped into "circuits," actual corrosion measurements taken at one inspection point in a circuit can be used to infer corrosion conditions in other portions of the circuit. This information can be used to determine the expected life for individual pipe sections and to determine a reasonable inspection schedule, that is, to schedule future inspections, to determine whether or not the anticipated corrosion rates are in fact experienced in practice.

There are several factors that affect the proper design of a piping corrosion monitoring system, particularly one which is to be implemented by computer program. For example, the program must take into account that there are several distinct types of corrosion mechanisms, and several different pipe failure modes according to which actual corrosion data measured at a first inspection point in the circuit must be processed in correspondingly different ways to yield realistic predicted data and projected inspection dates for piping not specifically inspected.

For example, a pipe may begin to leak when corrosion in a particular area, e.g. a pit, reaches its outside surface. On the other hand, a pipe may also fail when a large portion of its wall has been significantly corroded, such that the pipe splits or buckles in service, thus rupturing completely. In the former case, corrosion must extend all the way through the pipe wall for failure to occur. By comparison, in the latter case it may only be necessary for 80% of the wall of the pipe to be corroded away for it to rupture.

Prior work has recognized the desirability of separating the piping and associated vessels in a process plant into circuits having essentially common corrosion environments. It has also been recognized that multiple failure modes are possible within a single circuit and that these should be treated differently in connection with establishment of an inspection schedule based on anticipated corrosion rates, particularly where implemented by computer.

For example, Buhrow, "A Complete Computer Program for Inspection of Refinery Piping" Preprint No. 09-68, presented during the 33rd Midyear Meeting of the American Petroleum Institute's Division of Refining, May 15, 1968, discusses the piping circuit concept, according to which piping or other vessels in the plant that are exposed to the same corrosion environment are treated together, so that data taken from one inspection point in the circuit can be used to project corrosion at other points in the circuit not actually inspected in a particular inspection sequence.

In Buhrow, "The Computer Assists the Refinery Inspector: When to Inspect Piping," Preprint No. 35-71, presented during the 36th Midyear Meeting of the American Petroleum Institute's Division of Refining, May 13, 1971, which is incorporated by reference herein, the circuit concept is discussed further. This paper also mentions that some circuits, for example, those that carry more dangerous substances, or which would for other reasons cause more significant damage to property or be dangerous to persons if a failure occurred, must be monitored more closely than others. However, according to this paper, such matters should simply be taken into account by the inspector in selecting the inspection points, and in setting the "safety factor" of the circuit, that is, in determining the inspection date for particular elements of piping within each circuit.

This paper also describes a further concept useful in establishing a corrosion monitoring analysis program, the concept of the "test case." For the purposes of this application a "test case" defines a manner of calculating a predicted corrosion rate, that is, the test case is a mathematical model of a corrosion mechanism, and is thus useful in modeling and predicting corrosion.

A particular test case may take into account historical data for individual points in the system, for the overall circuit, the inspector's experience, a particular corrosion mechanism modeled, and like factors. For example, one test case which is of use defines the "point long rate." This term refers to the long-term rate of corrosion of the piping in the vicinity of a particular inspection point, which may be determined by dividing the total loss of piping wall thickness by the period between the earliest and latest inspection dates. Similarly, the "point short rate" is the amount of corrosion loss experienced between the two most recent inspection dates divided by the time interval between them.

It will be appreciated that if corrosion conditions are consistent the point long rate will ordinarily substantially equal the point short rate. Therefore, if after a particular inspection the point short rate substantially exceeds the point long rate for a particular inspection point, some factor contributing to corrosion at that inspection point has evidently changed, and some further investigation may be warranted.

Another exemplary test case described in the 1971 Buhrow paper relates to the "circuit formula-adjusted average rate." According to this test case, the circuit average rate, that is, the average of all the corrosion rates measured at the inspection points within a circuit, is multiplied by a statistically significant numerical factor. This test case provides a statistically significant estimated corrosion rate, which may be compared with other corrosion rates, such as the point long rates and point short rates, to yield a "worst-case" prediction for the corrosion rate.

More particularly, the 1971 Buhrow paper also reports that corrosion rates within a process plant were found to obey Gaussian statistics. Accordingly, the corrosion rates measured within a given circuit exhibit a normal Gaussian distribution, according to which values for generally comparable measured items are clustered about an average value. Therefore standard statistical methods can be used for corrosion-rate analysis, in particular, for assignment of risk factors to various sampling techniques.

For example, as described above, the circuit average rate is the average of all corrosion rates monitored in a particular circuit divided by the number of inspection points. This rate is useful in estimating corrosion according to one of the test cases. However, where the number of measurement points is small, one's confidence in the accuracy of the calculation, that is, in any conclusion to be drawn therefrom, is low; a large sample always affords greater confidence in the accuracy of statistical data analysis than does a small sample. Accordingly, where the number of corrosion rates actually measured is small, the calculated average rate may be adjusted by addition of a factor which statistically takes into account the standard deviation of the data and the number of actual measurement points used to generate the data, thus "factoring-in" the confidence value of the data. This is discussed in connection with FIG. 6 of the 1971 Buhrow paper under the heading "The Average Rate Adjustment Formula."

This paper also discusses the "maximum/average corrosion rate ratio," which is the ratio between the maximum corrosion rate measured within a particular circuit and the circuit average rate of corrosion. Where this ratio is high, typically greater than about 4, this indicates that at least one of the points within the circuit is corroding at a significantly higher rate than the others, and thus provides an indication that the entire circuit may require special attention. This can be instructively contrasted with the case in which the standard deviation "sigma" is relatively high for a given circuit, which indicates that all or most of the corrosion rates measured for a given circuit vary substantially about the average. Thus, if a large number of corrosion rates within a circuit are clustered around the average, the maximum rate of corrosion at a single point within the circuit can vary significantly from the average without affecting sigma substantially. Calculation of the maximum/average ratio allows one to determine when this has occurred.

Finally, the 1971 Buhrow paper also discusses the inspection date ratio (IDR), which is the result of division of the sum of the circuit update corrosion allowances, that is, the sum of the wall thicknesses remaining in particular piping elements before their individual retirement limits are reached, by the sum of the differences in time between the actual inspection dates and the most recent measurement dates, multiplied by the average rate of corrosion. In essence, the IDR relates the rate of corrosion, the amount of material remaining in the pipes of the circuit, and the circuit frequency of inspection, to provide an indication of the degree of conservatism employed in the calculation of inspection dates.

The 1971 paper suggests, in its discussion of FIG. 4, that risk factors corresponding to various conditions, such as the hazardous nature of the material being carried by a particular pipe, should be set by the inspector. In an implementation of the techniques described in that paper, a default risk factor was assigned if the inspector failed to specify a risk factor.

A later paper, Buhrow, "Computer Forecasting Inspection Dates From Metal Corrosion Data," which was presented at the American Society of Mechanical Engineers, Energy Sources and Technology Conference and Exhibition in Dallas, Tex., Feb. 17-21, 1985, describes a computer program for corrosion monitoring. This paper essentially updates the 1971 paper discussed above.

SUMMARY OF THE INVENTION

The improved piping corrosion monitoring system of the invention comprises a computer program that accepts data concerning an actual piping system, used in, for example, an oil refinery or chemical process plant, including data concerning corrosion rates of piping and associated vessels in the plant, data concerning corrosion-affecting factors relating to specific points within the piping and associated vessels, and data relating to the likelihood and extent of damage caused by piping failures in the system, and utilizes this information in generating a realistic schedule for inspection of various elements of the piping and associated vessels within the plant.

According to the invention, operation of the piping corrosion monitoring system begins with the division of the plant under study into circuits. In this step, piping and other vessels experiencing common corrosion environments, that is, which are of similar materials and which will be exposed to common corrosive agents, and to similar conditions of pressure, temperature and the like, are assigned to circuits. Individual inspection points are then defined within each of the circuits. The inspection points are selected by the inspector based on his experience and should include the points in the circuit at which corrosion is likely to be most damaging and/or to proceed most rapidly. Risk level safety factors, that is, safety factors which attempt to quantitatively assess the danger to persons or property caused by a failure at a particular inspection point, are defined for each of the inspection points. A database of historical corrosion data is established for each of the inspection points within each of the circuits.

At intervals, this database is used to determine a desired next inspection data for a particular point in a circuit. The next inspection date is derived by consideration of a number of factors, which may be assigned to differing "test cases." In general, the test cases each relate to a possible failure due to a particular corrosion mechanism and failure made. Each test case is used to define a particular predicted corrosion rate which in turn can be used to predict an "inspection date," based in effect on the anticipated time at which the piping or other vessel in the vicinity of the inspection point can be expected to fail according to the failure mode described by the particular test case. The earliest predicted inspection date, that is, the test case corresponding to the corrosion mechanism yielding the highest estimated rate of corrosion, is used to provide an actual recommended inspection date. In this way, an extremely conservative inspection date is selected, to reduce the chance of error.

According to an important aspect of the invention, and as mentioned above, risk level safety factors are assigned by the inspector or by the program for each of the inspection points. This information is taken into account when calculating the estimated inspection dates. In effect, this step recognizes that some failures are more damaging than others and hence must be more thoroughly avoided. It also recognizes that inspector manpower resources are limited and therefore focuses on the inspection points at which failure is most likely to be catastrophic and hence at which failure must most certainly be avoided.

BRIEF DESCRIPTION OF THE DRAWINGS

The invention will be better understood if reference is made to the accompanying drawings, in which:

FIG. 4 shows in schematic flow chart form the calculation of the inspection date;

DESCRIPTION OF THE PREFERRED EMBODIMENTS

Figure 1:
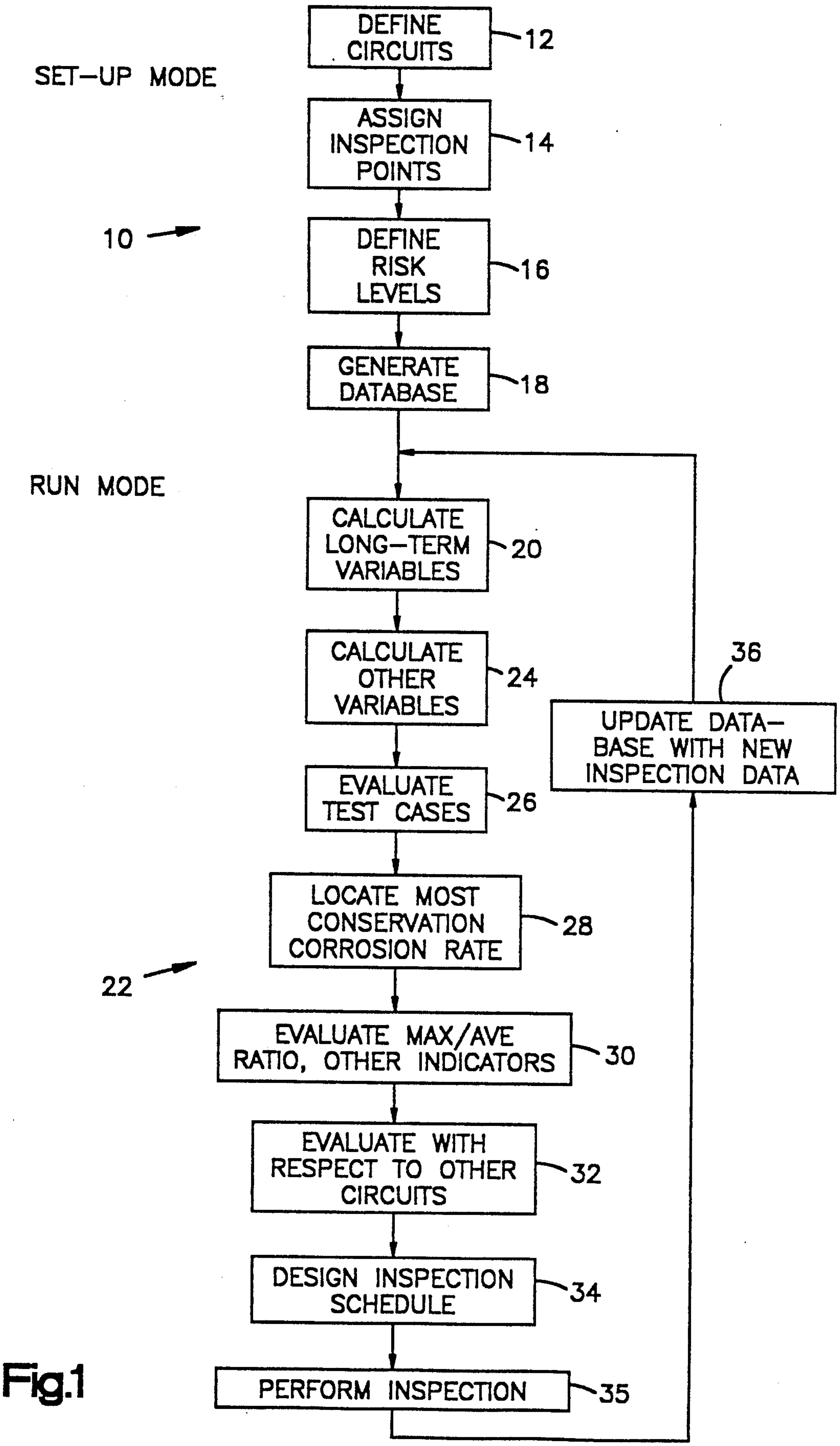
FIG. 1 shows overall the steps in setting up and operating a pipeline corrosion monitoring system according to the invention.

As described above, it is an object of the invention to provide a piping corrosion monitoring system which provides realistic inspection date scheduling. To be successful, this system must recognize simultaneously that a limited amount of manpower is available for inspection, that differing piping circuits within a process unit in a plant have different rates of corrosion, and more particularly that different risks are inherent in failure of particular piping circuits. Accordingly, the piping corrosion monitoring system of the invention takes into account the risk level inherent in each circuit, and provides a means of ensuring that the circuits having high risk factors are inspected more frequently than are less critical circuits, such that the net risk involved is reduced to the lowest possible level.

More particularly, the program according to the invention analyzes the rate of corrosion at each of a plurality of inspection points within each of a number of circuits in a particular process unit. Using this data the program successively generates a number of predicted corrosion rates for all the inspection points, based on a number of test cases corresponding to varying potential corrosion mechanisms. In subsequently calculating the inspection date, the program uses the maximum estimated corrosion rate, so as to provide the most conservative but realistic inspection date possible. Within each of the test cases, similarly conservative choices are made between possible values of data variables which are used in calculating the estimated corrosion dates.

Importantly, the program includes conservative default values for a number of process variables; for example, if the inspector fails to enter a risk factor value when setting up a particular circuit, the program will automatically provide a relatively conservative value, so as to ensure that the circuit will be inspected more, rather than less, frequently.

Additional refinements provided by the pipeline corrosion monitoring system according to the invention include sophisticated statistical analysis of the data so as to determine whether the circuits are properly assigned, to determine whether a particular point in the circuit is corroding notably more rapidly than other points in the circuit, and other useful refinements, which will appear more fully as the discussion below of the invention proceeds.

I. Overview of the Sister

When the pipeline corrosion monitoring system of the invention is first installed at a given plant, an extensive setup operation is performed. During this operation, the plant is divided into circuits, inspection points are assigned, risk levels are assigned to individual inspection points, and a data base of historical information is gathered. All these steps will be detailed below. Thereafter, the program is periodically run to generate an inspection schedule. From time to time, new inspection data generated by actual physical inspection of the piping and associated vessels in the various circuits are employed to update the data base.

Referring now specifically to FIG. 1, operation of the pipeline corrosion monitoring system according to the invention involves initial operation in a setup mode 10 and subsequent operation in a run mode 22. The setup mode will generally be undergone only when the pipeline corrosion monitoring system of the invention is installed for the first time in a particular refinery unit or other process plant.

The initial step in the setup mode is the definition of the individual piping circuits within the process unit, as indicated at 12. As discussed above, a piping circuit is a collection of piping and/or associated vessels which are considered to be part of the same corrosion environment, that is, which are exposed to the same process streams, and to similar pressure and temperature conditions, and which are of similar materials, such that they can be expected to corrode more or less uniformly. The advantage of dividing a process unit or plant into circuits is that if the circuits are properly defined, corrosion data determined by actual inspection of but a single or a small number of inspection points within a new circuit can be generalized to provide predicted corrosion data corresponding to other inspection points in the circuit which are not specifically inspected. Typically, the number of inspection points actually inspected will be expanded as the circuit approaches its retirement limit.

The next step in the setup mode 10 is the assignment of inspection points, as indicated at step 14. The inspection points are points at which the piping and associated vessels of each of the circuits are actually inspected from time to time. The inspection may be carried out using a wide variety of techniques generally known to those of skill in the art.

Typically, the assignment of the inspection points at 14 is performed by experienced inspectors, who will select the inspection points so that a range of representative corrosion locations in the circuit are actually inspected. In particular, it is desirable that points at which high corrosion rates are anticipated, e.g., due to critical piping configurations, or in areas where there is little fluid or gas flow, such as a closed-off end of a tee fitting, are selected for inspection, to make sure that the most rapidly corroded portions of the circuit are actually inspected.

The next step in the setup mode is the definition of risk levels, as indicated at step 16. At this stage, various factors that indicate the potential severity of damage due to a failure of piping in the circuit are evaluated by the inspector and are associated with the entire circuit as seems appropriate. These factors can include such matters as the human hazard posed by a failure in the circuit, whether or not the material to be carried by the particular circuit tends to spontaneously ignite upon exposure to the atmosphere, and whether or not the circuit is closely juxtaposed to personnel locations or to property subject to consequent damage if a failure occurs, such as a control room or power transformer facility. The design pressure and temperature, that is, the pressure and temperature conditions to which the circuit will be exposed, are also factors in the risk levels. As indicated briefly above, according to an important aspect of the present invention, the risk levels defined at step 16 are used in assigning inspection dates, such that the sections of the plant in which the consequences of a piping failure would be most severe are inspected on the most conservative possible schedule consistent with manpower and other inspection requirements.

In step 18, a data base is generated. In this step, historical records of corrosion at the individual inspection points measured over a period of years prior to the installation of the program are stored in the data base, thus generating a historical record of corrosion with respect to each of the inspection points, wherever this is possible. The historical data is employed, for example, to calculate the long-term corrosion rate for each inspection point.

In addition to the data base, the program also employs certain tables, such as scheduled retirement limits, that is, the wall thickness at which certain standard sizes of pipes in certain standard services should be replaced. Other data used by the program is similarly stored in tables. For example, according to an important object of the invention, values for some of the variables that would ordinarily be completed by an operator during a setup run are provided by the computer program.

In other cases, where the inspector has not supplied a value for a variable, the program may supply calculated values, in order to ensure that a conservative inspection date is calculated. For example, suppose that no risk level has been input for a particular inspection point. It would not be desirable to have a zero risk level as a default value, as this might lead to improperly long intervals between inspections. Accordingly, when no specific value corresponding to a risk level evaluation is input by the inspector, a relatively conservative risk level value is employed in calculation of the inspection date by the computer program, so that the inspection date will be calculated rather more frequently than otherwise. The tabular data may be used in such calculations, together with data based on actual inspections, as will appear below. If it turns out later that this over-conservative calculated value causes unnecessarily frequent inspections to be scheduled, consuming inspector time wastefully, the safety factor can subsequently be altered by an inspector.

The goal of operation of the piping corrosion monitoring system of the invention is to produce a workable inspection schedule, taking into account the risk factors, the maximum rates of corrosion for each of the circuits, and the limited amount of inspector manpower available. At the same time, it is desired that the most risky situations, that is, the circuits whose failure would be most catastrophic, be identified, without failing to identify corrosion that might occur at a much slower rate or in a less critical line.

Thus, when the run mode 22 is subsequently entered, the first step undergone is the calculation of certain long-term variables, as indicated at 20. For example, a "long rate" is calculated for each inspection point. The long rate is simply the amount of corrosion experienced at the pipe or vessel inspection point since the monitoring program was initiated, divided by the length of time between the first and most recent corrosion measurements. The long rate is thus simply the average rate of corrosion measured over the longest possible period of time. Values for certain other variables, that is, other than the long rate and the long-term variables calculated in step 20, are then calculated at 24. The specific variables which are used are discussed in detail below.

The next step 26 is to evaluate the various test cases for each of the individual points. As discussed above, corrosion may take place according to a wide variety of mechanisms, so that it is not accurate to simply assume that a single corrosion mechanism is at work at all times. According to an important aspect of the invention, a plurality of test cases, each essentially used to predict a particular corrosion rate in accordance with a particular potential corrosion mechanism and failure mode, are individually evaluated for each of the inspection points. A first group of the test cases are so-called "corrosion allowance test cases," which refer to corrosion of an entire section of pipe, to the extent that it would tend to split open or rupture. This type of corrosion thus takes place over a large portion of the interior of a pipe or other vessel and failure can occur before the pipe wall corrodes through. The other group of test cases, the "total thickness test cases," relate to localized corrosion such as pitting, which can occur at specific spots within a circuit. Failure in this failure mode requires corrosion equal to the total thickness of the pipe wall, as in order to cause a leak a pit must extend all the way through the wall of a pipe.

When all the test cases have been evaluated, that which provides the highest or most conservative corrosion rate is identified in step 28. In this way, regardless of the actual corrosion mechanism, or whether or not a particular method of estimating a corrosion rate is accurate, the most conservative estimated corrosion rate is employed to set the inspection date, thus providing an additional degree of safety to the ultimate calculation.

The next step 30 involves evaluation of the maximum/average rate ratios and other indicators for a particular circuit. The maximum/average rate ratio is simply the maximum rate of corrosion measured in a particular circuit divided by the average rate of corrosion in the particular circuit. This ratio indicates the degree of uniformity of corrosion throughout the circuit. If a particular point is corroding much more rapidly than others in the circuit, this ratio will be relatively high. This may indicate that special attention to the particular point may be needed, even though the remainder of the circuit wall is corroding at relatively low rate, or that the circuit sample needs to be expanded based on this actual evidence of an extreme corrosion rate. In effect, a large maximum/average ratio may indicate that several distinct corrosion mechanisms are present. Other indicators which can be evaluated at this time may include whether the points in a particular circuit are being inspected with the appropriate frequency. These indicators are discussed in detail below.

At step 32, the maximum/average ratios and other calculated variables provided by the program for a particular circuit may be evaluated with respect to similar values for other circuits similarly evaluated. This step is useful in allocating personnel resources appropriately for the inspection tasks.

After this has been done, an inspection schedule can be designed at step 34.

During the carrying out of the inspection in the sequence indicated by the inspection report in step 35, new data concerning actual corrosion at various inspection points will be collected; the data base is updated with this new data at step 36 prior to initiation of a subsequent run mode. For example, a run culminating in a new inspection schedule for a refinery unit might be performed once per year, generating the inspection schedule for the subsequent year.

II. A Typical Piping Circuit

Figure 2A:
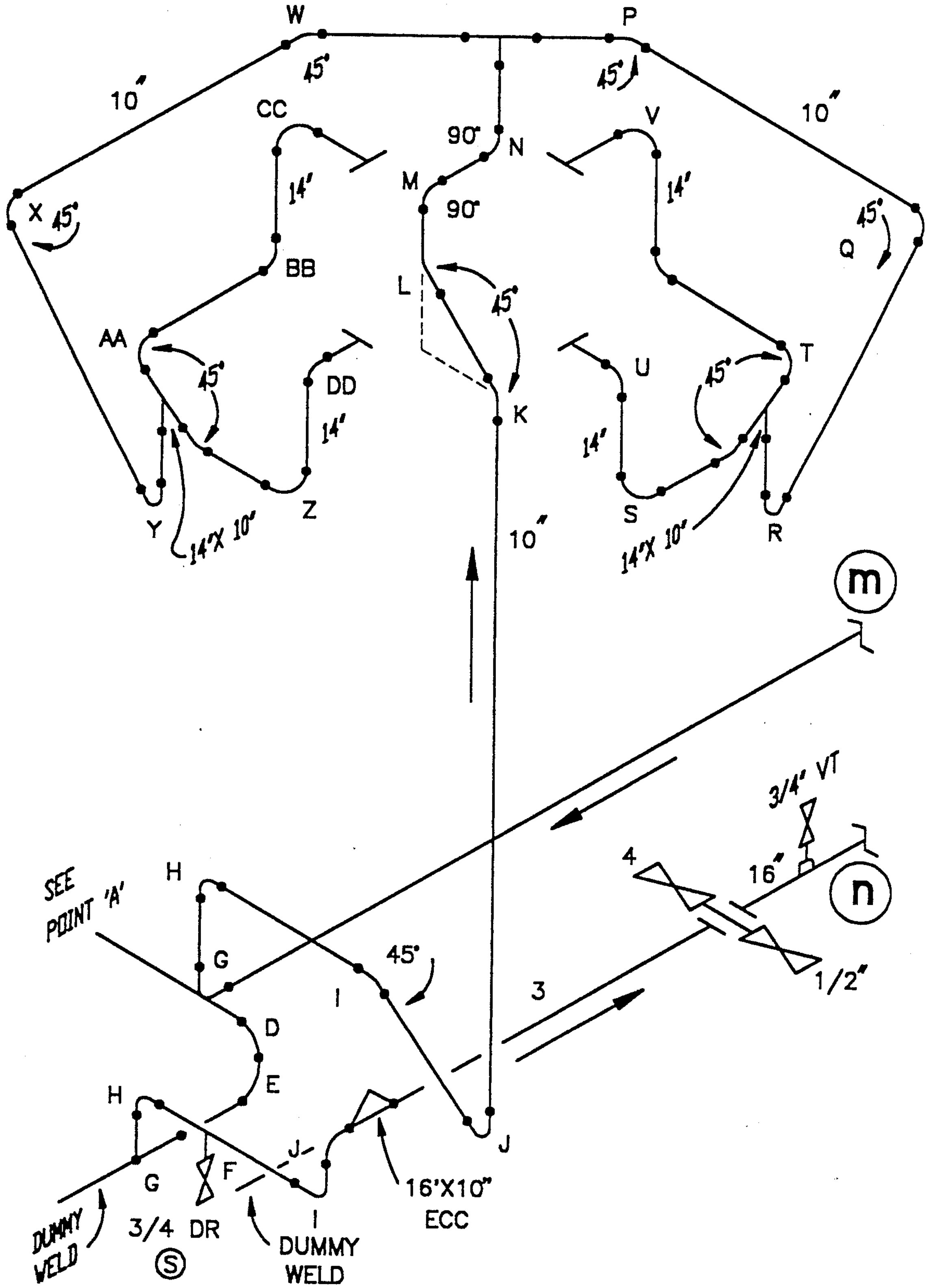
FIG. 2 shows an isometric drawing of a typical piping circuit within a process plant.
Figure 2B:
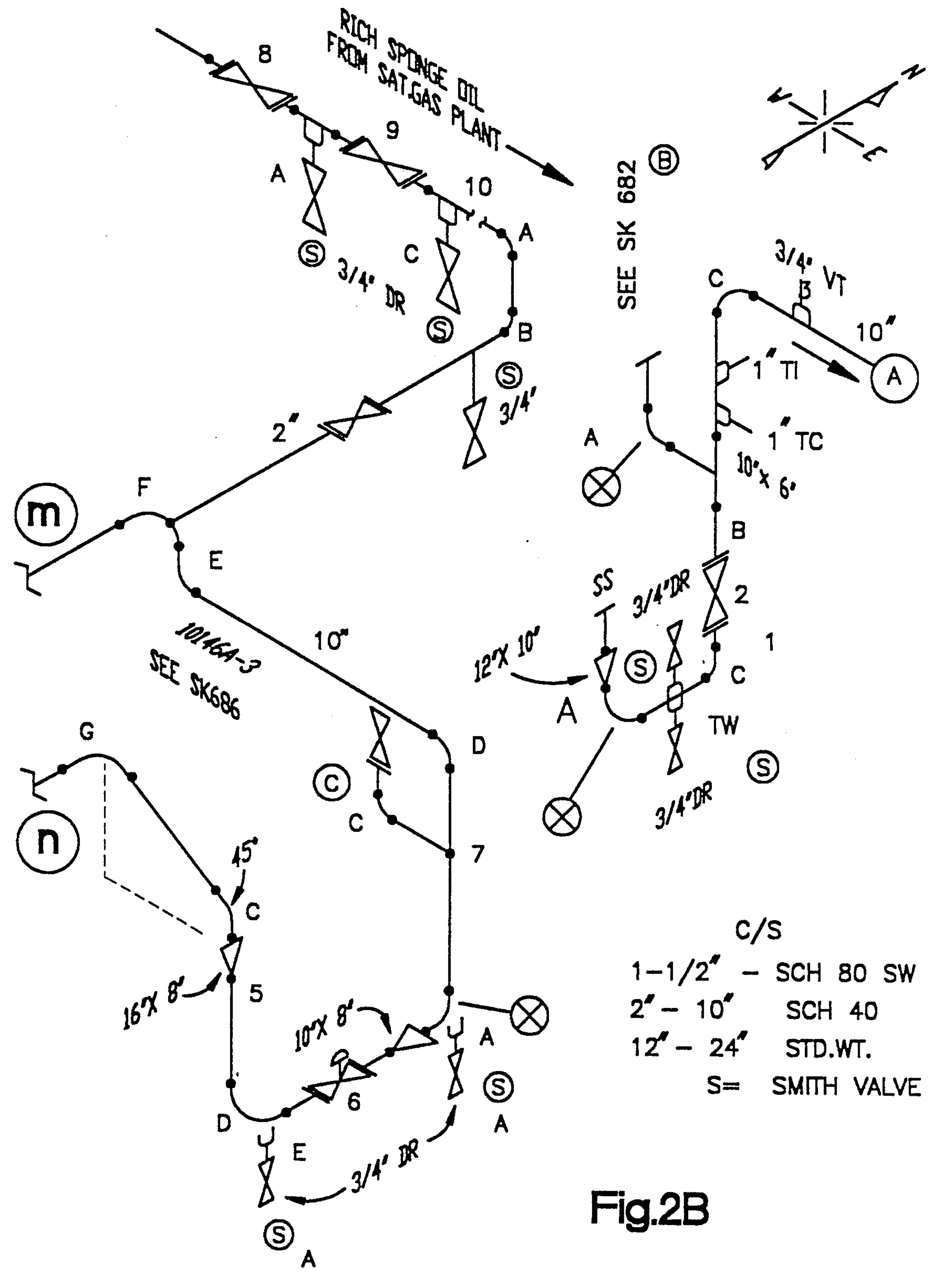

FIG. 2 shows an isometric diagram of a typical piping circuit. As will be apparent to those of skill in the art, this diagram describes a light gas-oil processing line. The diagram indicates the sizes of the various pipes and the fittings used to interconnect the piping sections, the relative locations of valves, drains, reducers, vents, and the like, and indicates the design and operating pressures and temperatures. The drawing also indicates the weight (that is, the original thickness) of the pipe used. For example, the legends shown at the lower right of the diagram indicate that where 1-½ inch diameter pipe is used it is to be Schedule 80, that is, relatively heavy-walled. Pipes between 2 and 10 inches in diameter are Schedule 40, and pipes between 12 and 24 inches in diameter are standard weight, which is slightly lighter than Schedule 40.

When an isometric diagram of the type shown in FIG. 2 is used in connection with the piping corrosion monitoring system of the invention it preferably also shows the individual inspection points, as indicated by circles with X within, for example, at points a, b, and c. Note that these locations are strictly exemplary and do not necessarily reflect the best points within this particular circuit for location of inspection points. As indicated above, the inspection points are selected by an inspector in initially setting up the data base corresponding to a particular circuit in a process plant, and correspond to the points at which his experience and judgment suggest that corrosion is most likely to cause a significant problem.

According to a particularly preferred embodiment of the program implementing the invention, it comprises an interface to a conventional software program that is particularly well suited to drawing isometric diagrams of the type shown in FIG. 2. Where the program implementing the pipeline corrosion monitoring system of the invention is run on an IBM PC computer, as is preferred, this software program may be "AutoCAD," available from AutoDesk, Inc., of Sausalito, Calif.' In this embodiment, during the setup run, the operator can design isometric diagrams as shown in FIG. 2 corresponding to each of the defined circuits, and can use these subsequently to input the data. For example, he may use a "mouse" or other cursor positioning device to locate a legend in the vicinity of a particular fitting appearing on a particular isometric diagram, e.g. to make notes concerning the actual location of the inspection point on the diagram. Later, when new actual inspection data is available, the same procedure can be used to locate the particular inspection point on the isometric diagram at which the actual pipe wall thickness has been measured. When the cursor has been positioned at the appropriate location, the operator can simply input the data. This eliminates certain inconveniences, inaccuracies and errors which might be caused if the operator had to separately input the thickness measurement made and the location of the inspection point, e.g., as a set of coordinates, an alphanumeric identification of the inspection point, or the equivalent.

III. Overview of Calculation of the Inspection Date

Figure 3:
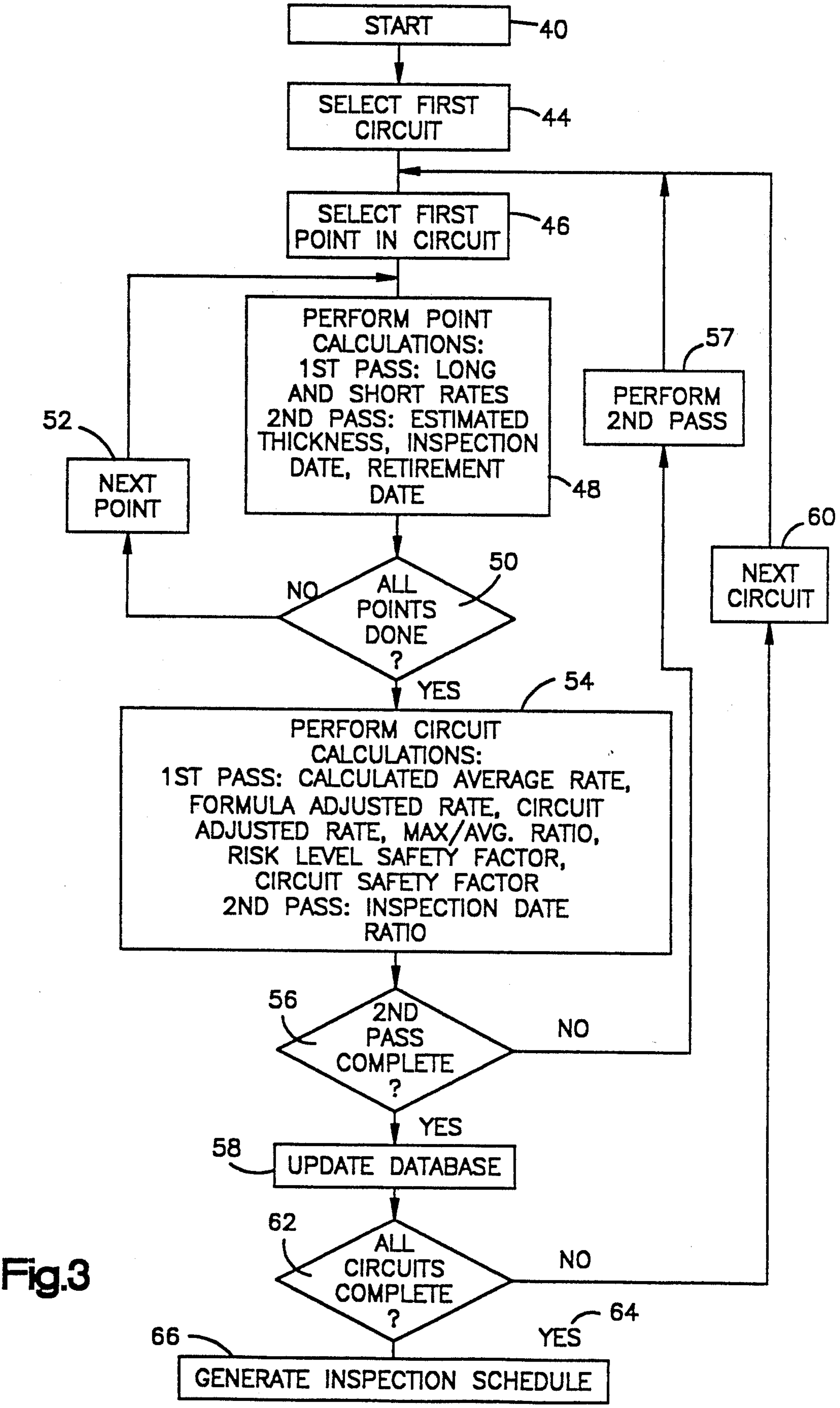
FIG. 3 shows the manner in which the program of the invention involves an interactive, multiple-pass process of data calculation.

FIG. 3 shows in block diagram form the sequence of steps leading to the generation of an inspection schedule for a particular process plant, e.g., processing in the run mode of the processing according to the invention, as shown at 22 in FIG. 1. The actual calculations performed are detailed below. FIG. 3 shows that two "passes" through the data base are required, that is, that the process involves performance of calculations employing in turn data relating to each of the points of the circuits. This two-pass approach is necessitated because several variables which can only be calculated at the conclusion of the first pass, for example, the circuit average rate, are subsequently used in a second pass through the same points, e.g., to calculate the inspection dates.

Accordingly, the block diagram provided in FIG. 3 shows this two-pass processing arrangement. Processing begins at 40 in FIG. 3. A first circuit for processing is selected at 42 and a first point in that circuit is selected at step 46. Individual point calculations are performed at step 48. In the first pass, the long and short corrosion rates, which are actual corrosion rates, determined respectively as the total loss in wall thickness of a particular piping element divided by the time between the first and most recent readings, and the actual loss in the wall thickness between the last reading and the next preceding reading, divided by the length of time therebetween, are calculated.

When the long and short rates for all points have been calculated, as determined in steps 50 and 52, circuit calculations are carried out at step 54. The circuit calculations carried out during the first pass include calculation of the calculated average rate, the formula adjusted rate, the circuit adjusted rate, the maximum/average ratio, the risk level safety factor and the circuit safety factor. All of these calculations and their significance are discussed below. In the second pass, point-by-point calculations performed at 48 include the estimated thickness, the inspection date, and the retirement date. Circuit calculations performed in step 54 of the second pass include calculation of the inspection date ratio. The calculations are also discussed in detail below.

When a circuit has been completely treated in this manner, the data stored in the data base can be updated at 58. Subsequent circuits are then treated similarly as indicated at 60 and 62.

When processing for all the circuits has been completed, as indicated at 64, an overall schedule for the inspection of various circuits, essentially comprising the inspection dates generated for each point, can then be generated at step 66.

In this manner, the limited resources available to the inspection team of any process plant can be optimized and their work ordered to the most possibly critical situation first.

IV. Detailed Calculations

FIGS. 4 through 10 show schematically the flow of data through the pipeline corrosion monitoring system of the invention. These diagrams are effectively flow charts of various portions of an overall computer program implementing the pipeline corrosion system monitoring system of the invention. For example, FIG. 4 shows the steps in calculation of an inspection date for a particular inspection point, indicating the data used to calculate the inspection date, and shows the sources of the data items. Certain of the data items employed in the calculation of the inspection date shown in FIG. 4 are themselves derived according to multistep processes which are described in FIGS. 5 through 10.

A. Calculation of Inspection Date

FIG. 4 shows, as mentioned, the steps taken in the calculation of the inspection date applicable to a particular point within a particular circuit in a process plant in which the piping is monitored using the piping corrosion monitoring system according to the invention. (Where the term "piping" is used herein, it is to be understood that this includes fittings such as valves, elbows, tees and the like, as well as associated vessels and other elements, in addition to pipe itself). The "inspection date" thus derived may be defined as the ideal recommended next inspection date that can be developed on the basis of circuit corrosion information available when the program is run.

As shown in FIG. 4, the inspection date is generated at step 100. The inspection date is the sum of the latest circuit reading date, as indicated at 102, which is the last time at which an inspection point was actually measured anywhere within the particular circuit, and the test case time as indicated at 104. The test case time 104 is determined in a manner which is detailed below and represents, in effect, the period of time that can safely be permitted to elapse between inspections. The test case time 104 is determined in accordance with various factors to ensure that inspection is performed at sensible, conservative intervals. Thus, the inspection date derived at 100 for a particular point is the sum of the circuit reading date and an estimated safe time between inspections, the test case time.

Note that in this manner the "circuit" concept, described above, finds utility: the individual inspection date is derived based on the latest circuit reading date, which is the last time at which any inspection point within the particular circuit was measured, not the last time on which the point with respect to which the particular inspection date being derived was inspected. Instead, to the latest circuit reading date is added a test case time that is derived with respect to the particular point. In this manner, an ideal inspection date is derived based on actual data for the circuit (the latest circuit reading date) plus an anticipated rate of corrosion for the particular inspection point (the test case time).

The test case time, as indicated at 105, is the lesser of the corrosion allowance test case time 106 and the total thickness test case time 108. These two test case times relate respectively to two distinctly·different failure modes that can occur due to corrosion of a particular pipe or associated vessel; in each case one or several different corrosion mechanisms may contribute to the failure.

The corrosion allowance test case time 106 is derived based on the amount of time required for the "corrosion allowance" of a pipe to corrode away, that is, for the pipe to reach its "retirement limit," that is, when its wall thickness is a predetermined or calculated minimum safe wall thickness at which it should be replaced. The corrosion allowance test case time 106 is derived in a manner discussed in detail below. As indicated, this test case time is designed to refer to a failure mode in which an entire portion of a pipe is corroded to a point that it splits open or ruptures, that is, fails completely in service. Accordingly, the corrosion allowance test case time reflects a failure mode in which the overall thickness of the wall of the pipe safely reaches a retirement limit, after which it is increasingly likely to fail catastrophically.

By comparison, the total thickness test case time 108 reflects the (relatively safe) failure of a pipe in a leaking mode wherein a pit or leak caused by corrosion extends all the way through the wall of the pipe. Of course, this analysis is employed for calculation of an inspection date; leaks are not anticipated in practice of the method of the invention.

As shown, the total thickness test case time 108 is the result of division of the estimated thickness of the particular pipe in which the inspection point is located, as indicated at 110, by the total thickness test case rate as indicated at 112, that is, bY an estimated corrosion rate calculated in accordance with a particular test case. Hence, the total thickness test case time is simply the estimated thickness of the pipe divided by an estimated corrosion rate. The estimated thickness 110 is derived in a manner which is discussed below in connection with FIG. 5, as indicated at the left of FIG. 4. The total thickness test case rate 112 is the greatest of several different estimated corrosion rates, as indicated at 114, chosen to ensure that the most conservative possible estimate is employed.

As indicated at 114, the total thickness test case rate is the greatest of three factors. The first of these is the circuit adjusted rate multiplied by the circuit safety factor. Each of these in turn is selected from three possible candidates, so that a total of nine test cases are in fact evaluated when this multiplication is carried out. Its result is then compared to a maximum point long rate and to a maximum point short rate. The maximum point long rate is the maximum long-term corrosion rate at any point within the particular circuit, that is, is the highest net corrosion rate measured over the entire period during which an inspection program has been in place. In essence, the long rate is simply the thickness of the pipe when installed less the thickness when most recently measured, divided by the interval of time between the first and most recent measurements. Comparably, the short rate is the difference in wall thickness caused by corrosion of the pipe between two measurements, closely spaced in time (preferably separated by at least 0.4 years, to avoid measurements the error of which is comparable to total change in wall thickness) divided by the interval between the corresponding inspection dates. (Recognizing that occasionally thickness "growths" are measured erroneously, the program ignores any such measurements). In each case, the "maximum point" language indicates that the maximum long and short rates within the particular circuit are used in determination of the total thickness test case rate, again to provide the most conservative possible estimates for the total thickness test case rate 112. As indicated, this value is the greatest rate estimated using eleven different methods of analysis, that is, eleven test cases, each corresponding to a different corrosion mechanism or model.

The corrosion allowance test case time 106 is the result of division of a corrosion allowance 116 by a corrosion allowance test case rate 118. Again, this is a division of a loss in wall thickness by an estimated corrosion rate and thus reflects the amount of time needed for the pipe to corrode to its service limit.

Figure 5:
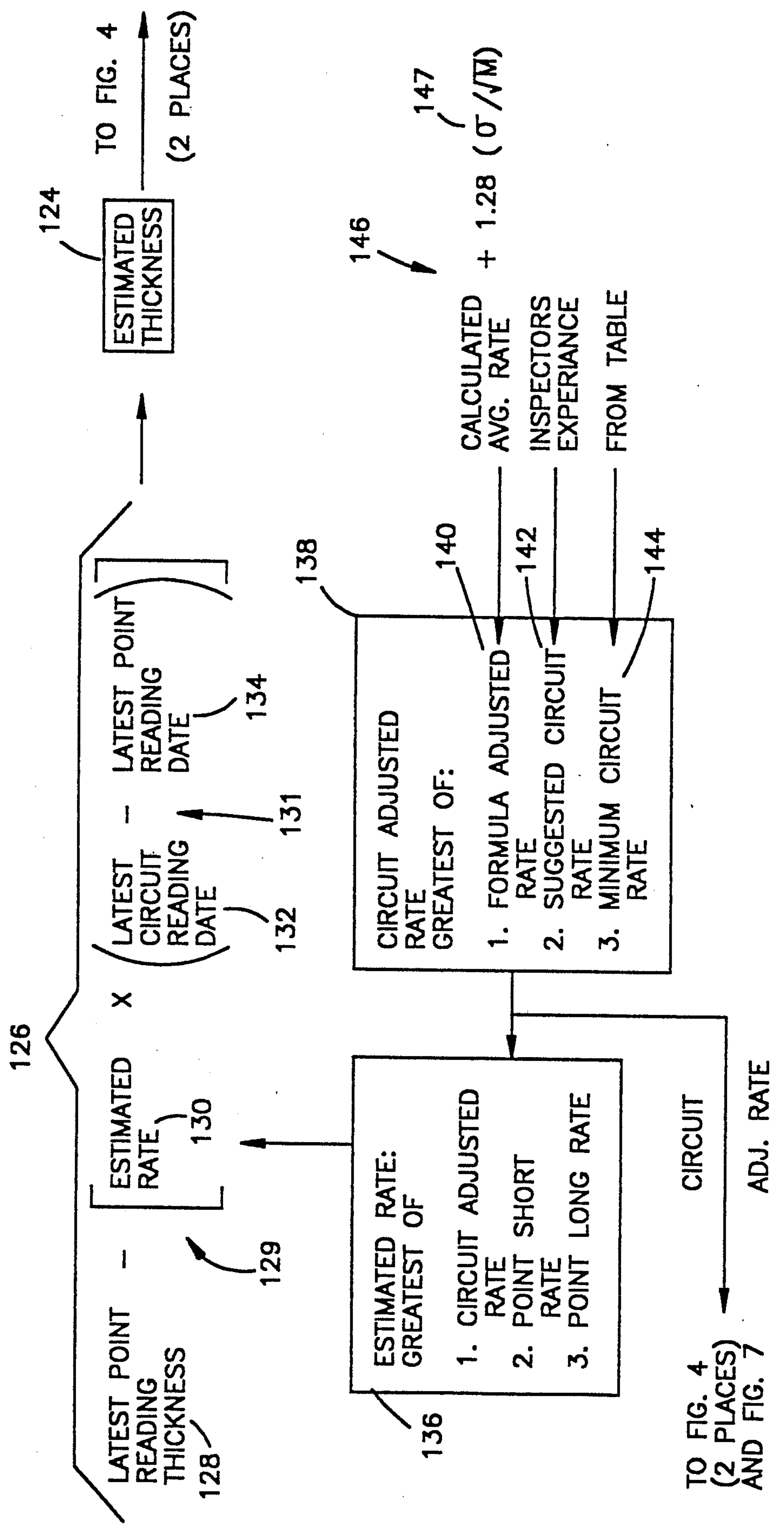
FIG. 5 shows in schematic flow chart form the calculation of the estimated thickness and circuit adjusted rate, which are parameters used in the calculation of FIG. 4.

The corrosion allowance 116 is the amount of loss due to corrosion that can be permitted safely, and as indicated at 120 is equal to the estimated thickness (which is derived as shown in FIG. 5) less the retirement limit, that is, the minimum allowable useful wall thickness. The retirement limit is determined in accordance with a calculation detailed in FIG. 6.

As shown at 122, the corrosion allowance test case rate 118 is the greatest of five test case rates. These include (i) the circuit adjusted rate, the calculation of which is discussed in connection with FIG. 5. The circuit adjusted rate is itself the greatest of three distinct corrosion rates each corresponding to different corrosion mechanisms. Other rates considered in determining the corrosion allowance test case rate 118 include (ii) the point short rate, which is the short-term corrosion rate of the particular point with respect to which the inspection date 100 is to be calculated; (iii) the point long rate, multiplied by 1.25, which is the long-term corrosion rate measured at the particular point, multiplied by 1.25 for purposes of providing a conservative estimate; and (iv) the calculated average rate multiplied by 2, which is the average rate of corrosion for all the inspection points in a particular circuit multiplied by 2. This test case rate is employed to meet typical industry safety standards, which specify that an inspection should be performed when one-half of the remaining corrosion allowance has been consumed, ensuring a conservative estimate. Finally, a fifth test case (v) is the calculated average rate plus 2 × sigma, which is the same calculated average rate discussed above plus a quantity equal to a statistically significant factor "sigma," multiplied by two.

The term "sigma" (shown on the drawings by the lower-case Greek letter) is used herein, as in conventional statistical analysis, to refer to the standard deviation of a collection of data items. In this case, the data are the measured rates of corrosion for the inspection points in a particular circuit. Sigma thus represents the amount of deviation of the corrosion rates from their average, that is, measures the uniformity of the corrosion rates within the circuit. (Where sigma is high, for example, this indicates that a wide variety of corrosion rates exist within the circuit. In turn, this may imply that the circuit has been improperly denominated, for example, that it needs to be divided into smaller circuits having more uniform point corrosion rates.) Sigma thus reflects statistically the possible departure of each individual point corrosion rate from the circuit average rate, and is used in the program implementing the piping corrosion monitoring system of the invention to provide conservative estimates for point corrosion rates within the circuit.

In the present case, in test case (v), which is considered in determining the corrosion allowance test case rate 118, sigma is multiplied by 2 to provide a very conservative test case. In general, that is, for any statistical distribution of points obeying a normal Gaussian distribution, 5.46% of all the individual data items will be contained within plus or minus 2 × sigma from their average value. Hence, the addition of 2 × sigma to the calculated average rate provides a very conservative estimate of the corrosion allowance test case.

Thus, as indicated at 122, the corrosion allowance test case rate 118 is the greatest of five rates calculated using relatively differing methods of arriving at an estimated corrosion rate. This very conservative figure is then used at 106 to provide a corrosion allowance test case time, which in turn is compared to the total thickness test case time, to generate an overall test case time, which is added to the latest circuit reading date to arrive at an inspection date for a particular point within a particular circuit of a particular process plant.

B. Calculation of Estimated Thickness and Circuit Adjusted Rate

FIG. 5 shows the calculation of the estimated thickness 124, which is used at several places in FIG. 4 as indicated thereon, and of the circuit adjusted rate 138 which is also used in several places in FIG. 4 and also in the calculations (shown in FIG. 7) of the circuit safety factor. The estimated thickness 124 is calculated for each inspection point at which the piping has not been inspected during the most recent field inspection of the circuit using the equation indicated generally at 126. Specifically, the estimated thickness 124 is the latest point reading thickness 128, that is, the thickness of the pipe when most recently inspected, less a quantity 129 equal to the estimated rate 130, which is calculated in a manner described below, multiplied by a quantity 131, which is equal to the latest reading date for any point within the circuit 132 less the latest reading date for the particular point 134. The quantity 131 is thus the length of time between the most recent date of reading of any point within the circuit and the date of the most recent inspection of the particular point. The term 129 is equal to the estimated rate of corrosion 130 multiplied by the time during which the estimated rate of corrosion has been in effect. This quantity is then subtracted from the thickness of the actual point under consideration when most recently read (quantity 128), yielding a value for the present estimated thickness 124 of the pipe. For a point inspected during the most recent inspection of the circuit, quantity 129 is zero, so the estimated thickness equals the measured thickness.

As mentioned, the estimated rate 130 is the greatest of the circuit adjusted rate, the point short rate, and the point long rate, all as indicated at 136. The point short rate and point long rate have already been defined. The circuit adjusted rate is calculated as indicated at 138. This is the greatest of the formula adjusted rate 140, a suggested circuit rate 142, which as indicated is provided by the inspector based on his experience, and a minimum circuit rate 144, which as indicated is derived as a function of years in service from a permanently stored table. Typical minimum circuit rates stored in this table range from 0.005 inches per year for total exposure of 0 to 2.5 years down to 0.001 inches per year for pipes in service between 20 and 40 years.

Figure 9:
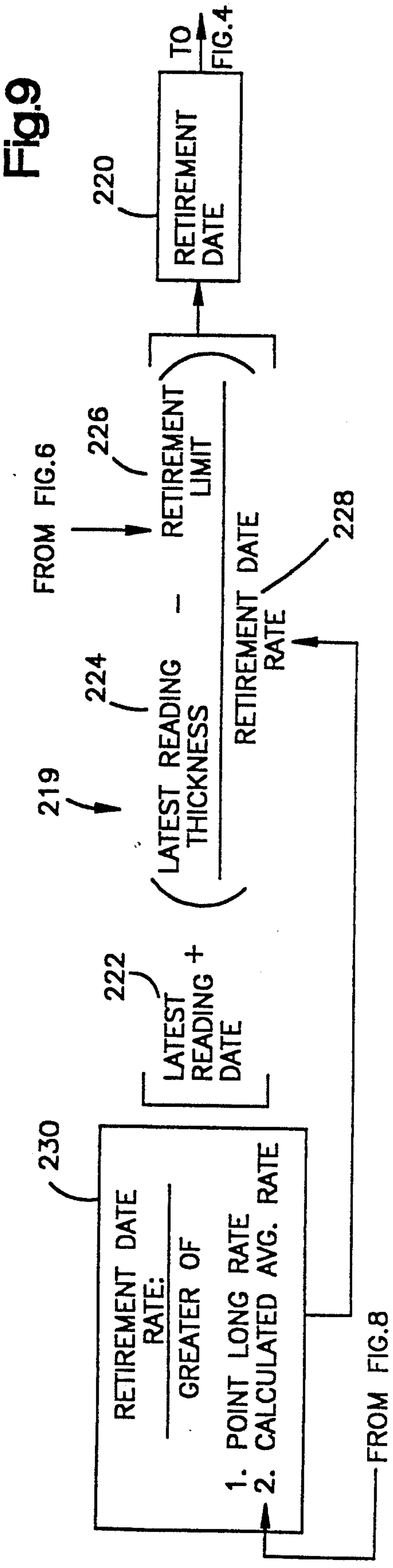
FIG. 9 shows a calculation of retirement date, applicable to each element with a piping circuit.

As indicated at 146, the circuit adjusted rate 140 is the calculated average rate, which is calculated in accordance with FIG. 9, and which represents the average rate of corrosion throughout the circuit, plus a quantity 147, equal to 1.28 $\times$ sigma divided by the square root of n, where n is the total number of actually-inspected points within a particular circuit. Again, the addition of the quantity 147 is intended to "inflate" the calculated average rate by an amount statistically selected, to ensure that at minimum a reasonable adjusted rate is employed as the formula adjusted rate. Division by the square root of n ensures that the "inflation" will be less for large samples, which are more reliable.

As indicated above, the estimated rate 136 is the greatest of the circuit adjusted rate, the point short rate and the point long rate. This comparison assures that a reasonable estimated rate is derived; this is ultimately used as indicated above to produce a value for the estimated thickness 124, which is used in both the total thickness test case time and corrosion allowance test case time calculations which are performed in accordance with FIG. 4 as discussed above.

Those of skill in the statistical art will recognize that the quantity 147, equal to 1.28 $\times$ sigma divided by the square root of n, arises from the fact that of a particular data sample obeying the normal Gaussian distribution rules, 90% of all the data samples will fall within this quantity 147 from the average value. Addition of quantity 147 to the calculated average rate in step 146 provides a very conservative formula adjusted rate 140 for comparison to the point short rate and the point long rate, to arrive at the estimated rate 130.

C. Calculation of Retirement Limit

Figure 6:
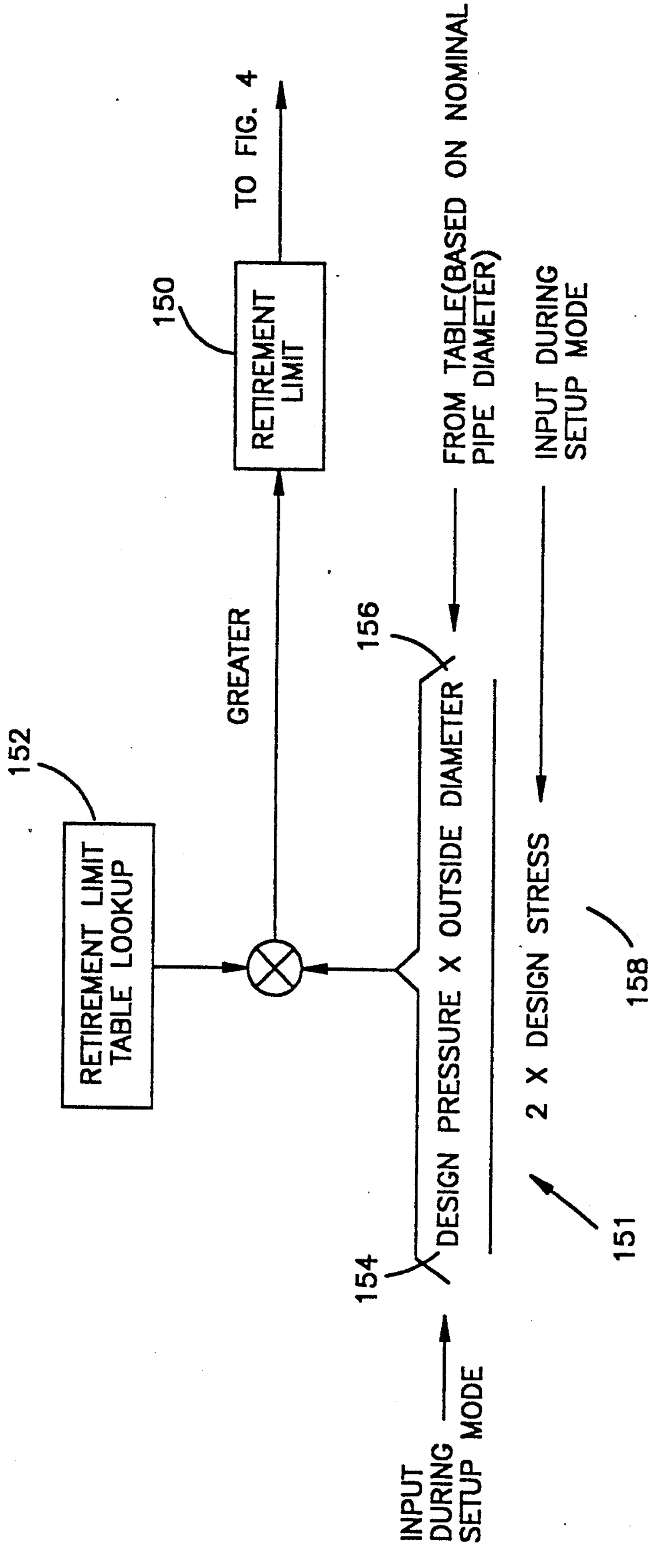
FIG. 6 shows in schematic flow chart form the calculation of the retirement limit, which also is a quantity used in the calculation of FIG. 4.

FIG. 6 shows the steps taken in calculation of a retirement limit 150 for a particular section of pipe. As noted, this quantity is computed for each inspection point within a particular circuit. The retirement limit 150 is simply the greater of a retiring limit, selected from an appropriate precalculated look-up table as indicated at 152, and a quantity 151 which is calculated by multiplying the design pressure 154, that is, the pressure at which the pipe was designed to operate, by the outside diameter 156, and dividing the result by twice the design stress 158. The result of this calculation results in a wall thickness value which should not be exceeded according to good design practices. The design pressure 154 and design stress 158 are input as indicated to the data base during set-up of the program implementing the pipeline corrosion monitoring system of the invention, that is, as part of definition of the inspection points. The outside diameter 156 is obtained from a look-up table responsive to a nominal pipe size value input during the set-up mode. The retirement limit 150 calculated in FIG. 6 is used in determining the corrosion allowance 116 which in turn is used in deriving the corrosion allowance test case time, all as noted in FIG. 4.

D. Calculation of Circuit Safety Factor

Figure 7:
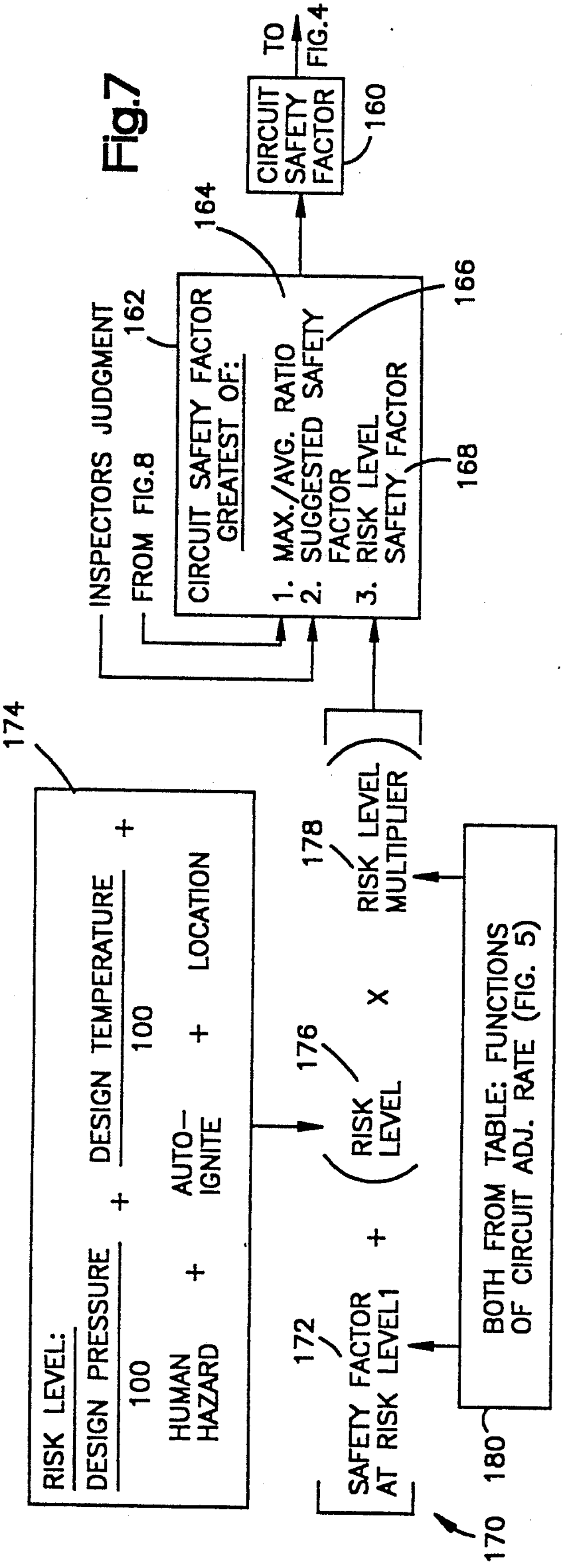
FIG. 7 shows the calculation of the circuit safety factor, also used in the calculation of FIG. 4.

FIG. 7 shows the steps in calculating the circuit safety factor 160. As noted, this quantity is computed for each circuit and is used as indicated in FIG. 4 in calculation of the total thickness test case rate. The circuit safety factor in essence incorporates the potential harm posed by failure of a particular circuit to life or property into the calculation of the total thickness test case time, and thus provides a very conservative inspection date. For example, where a dangerous material is being piped or where the material might spontaneously ignite upon exposure to the atmosphere or the like, proper and appropriately frequent pipe inspection is clearly crucial. Thus, as indicated at 162, the circuit safety factor 160 is the greatest of the maximum/average ratio 164, which is calculated in accordance with FIG. 8 below, a suggested safety factor 166 which as indicated is input by the inspector based on his judgment, and a risk level safety factor 168.

In a preferred embodiment of a computer program implementing the system of the invention, if the inspector fails to input a value for the suggested safety factor, either the maximum/average ratio or the calculated risk level safety factor is used.

The risk level safety factor 168 is the result of a calculation indicated at 170. The calculation 170 shows that the risk level safety factor 168 is the sum of the safety factor at risk level 1, quantity 172, plus a quantity equal to a risk level 176, calculated as indicated at 174, multiplied by a risk level multiplier 178. The risk level 176 is a number the calculation of which is detailed below, and which in the preferred embodiment varies between 1 and 40. As indicated at 180, the risk level multiplier 178 and the safety factor at risk level 1 172 are both derived by table look-up as functions of the circuit adjusted rate, which is calculated in accordance with FIG. 5 above.

The values for the safety factor at risk level 1 172 and the risk level multiplier 178 both decrease as the circuit adjusted rate, which is an estimate of the average corrosion rate within the circuit, increases. Thus, for example, where the circuit adjusted rate is between 0.0018 and 0.0023 inches per year, the safety factor at risk level 1 is 5.97 and the risk level multiplier is 0.2263. If the corrosion rate is higher, e.g., between 0.0201 and 0.0240 inches per year, the safety factor risk level 1 is 3.04 and the risk level multiplier is 0.0735.

In effect, the safety factor at risk level 1 172 represents a minimum safety factor. The risk level 176 represents the potential danger caused by failure of the circuit. The risk level multiplier 178 is used to multiply the risk level 176 by a number which is chosen by table lookup as a function of the circuit adjusted rate of corrosion, as indicated at 180. As mentioned, where the circuit adjusted rate is low, the safety factor at risk level 1 172 and the risk level multiplier 178 are both relatively high. This reflects the actual experience, described in the Buhrow 1971 paper discussed above, that circuits having a low average rate of corrosion may nevertheless have one or more points which exhibit a high rate of corrosion. Calculation of the risk level safety factor 168 is accordingly intended to insure that such low average corrosion rate circuits carrying dangerous products are inspected with a frequency commensurate with the fact that one or more points therein may have a high rate of corrosion.

Consider the following example. Suppose a piping circuit in a refinery unit has 20 inspection points, and that of these 19 exhibit extremely low corrosion rates. One point, however, due to a particular piping configuration, exhibits a relatively high corrosion rate. However, only a subset of the 19 points exhibiting the low rate are actually inspected, so the high rate is not detected. The circuit furthermore carries a hazardous product. If the circuit were inspected with an inspection frequency based solely on the circuit average rate, failure might occur at the one point having a high corrosion rate. The calculation of the risk level safety factor 168, that is, in which the risk level is multiplied by a relatively high risk level multiplier and added to a relatively high safety factor at risk level 1, both corresponding to the relatively low circuit average corrosion rate, insures that inspection will take place at a more appropriate frequency. By comparison, if the high corrosion rate point were one of those actually inspected, a high maximum/average ratio would be calculated. Other test cases (e.g. the point long and short rates) would also locate this point. Furthermore, as the sample is expanded as the circuit approaches its retirement limit, such high-rate points are reliably detected.

FIG. 4 of the 1971 Buhrow paper referred to above shows dramatically that circuits having low average rates of corrosion tend to have high maximum/average ratios and vice versa; this makes rigorous the intuitive assumption that a larger departure from the average corrosion rate can be expected in a circuit where the average rate is low. The several curves shown in FIG. 4 of that paper correspond to relative degrees of risk which may be selected; that is, if a circuit carries a hazardous product, one will typically inspect it at a higher rate, e.g. as suggested by one of the upper curves shown on FIG. 4 of that paper. If the circuit carries a relatively safe product, one can inspect it at a lower frequency, as suggested by one of the lower curves. The calculation appearing at 170 of FIG. 7 essentially renders automatic this selection. That is, the tables storing the safety factor at risk level 1 and the risk level multiplier which are looked up at 180 essentially store the data which is depicted in FIG. 4 of that paper. The value selected for the safety factor at risk level 1 reflects the lower curve on FIG. 4, that is the lower risk curve, which corresponds to risk level 1, and the risk level multiplier values stored in the table represent an amount of upward adjustment selected in accordance with a risk level 176 calculated as indicated at 174.

Accordingly, the result of the calculation shown at 170 and 174 is to derive a risk level safety factor 168 as a function of the average corrosion rate within the circuit and of the potential damage which could be caused by failure of the circuit.

The risk level 176 to be employed is calculated at 174. As indicated, the risk level 176 is equal to the sum of the design pressure divided by 100, the design temperature also divided by 100, a quantity referred to as human hazard, which is simply a number representing the danger to human life provided by the substance being carried by the particular pipe under analysis, a value called "auto ignite," which simply indicates whether the material being carried will spontaneously combust in air, and a value for "location," which is a quantity reflecting the proximity of the circuit to control rooms, laboratories or other particularly valued installations or those particularly requiring security, e.g., electrical substations. The maximum/average ratio may also be added to the parameters summed at 174 to yield the risk level 176 used in calculation of the risk level safety factor 168.

Figure 8:
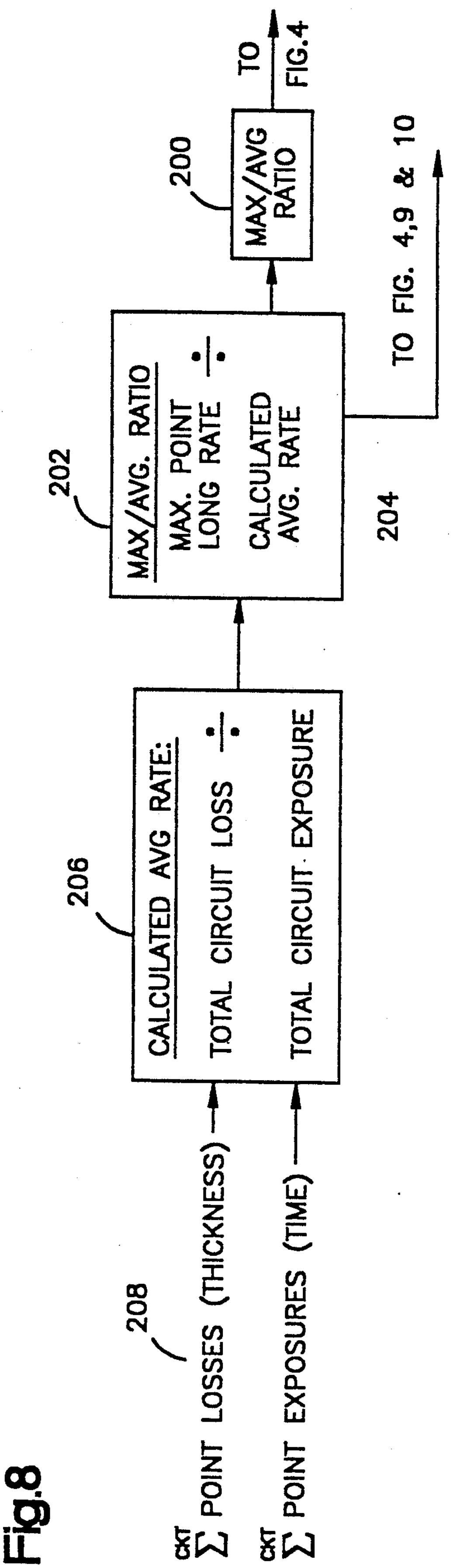
FIG. 8 shows the calculation of the maximum/average ratio, and the calculated average rate, which are used in connection with the calculation of FIG. 4.

As indicated in FIG. 7, the maximum/average ratio is calculated as shown in FIG. 8 and indicates the degree to which corrosion at any particular point departs from the circuit average corrosion rate. A large maximum/average ratio may suggest, for example, that several corrosion mechanisms are contributing to the corrosion within a circuit. The maximum/average ratio 164 is thus one of the quantities compared at 162 to yield the circuit safety factor 162, again to ensure that a conservative value is selected.

E. Calculation of the Maximum/Average Ratio and the Calculated Average Rate

FIG. 8 shows calculation of the maximum/average ratio 200 and of the calculated average rate 204, which are done for each circuit in a particular unit. The maximum/average ratio 200 is simply the result of division of the maximum point long rate 202, that is, the greatest long term corrosion rate at any point within the circuit, by the calculated average rate 204, which is the average measured rate of corrosion throughout the circuit. As indicated at 206, the calculated average rate 204 is the result of division of the total circuit loss by the total circuit exposure. As indicated at 208, the total circuit loss is the sum over the circuit of all the point losses in thickness. As indicated at 210, the total circuit exposure is the sum over the circuit of all the point exposures, that is, the time during which to which the elements of the circuit had been exposed to corrosive agents.

This concludes detailed discussion of the derivation of the quantities required for calculation of the inspection date 100 in connection with FIG. 4.

Figure 10:
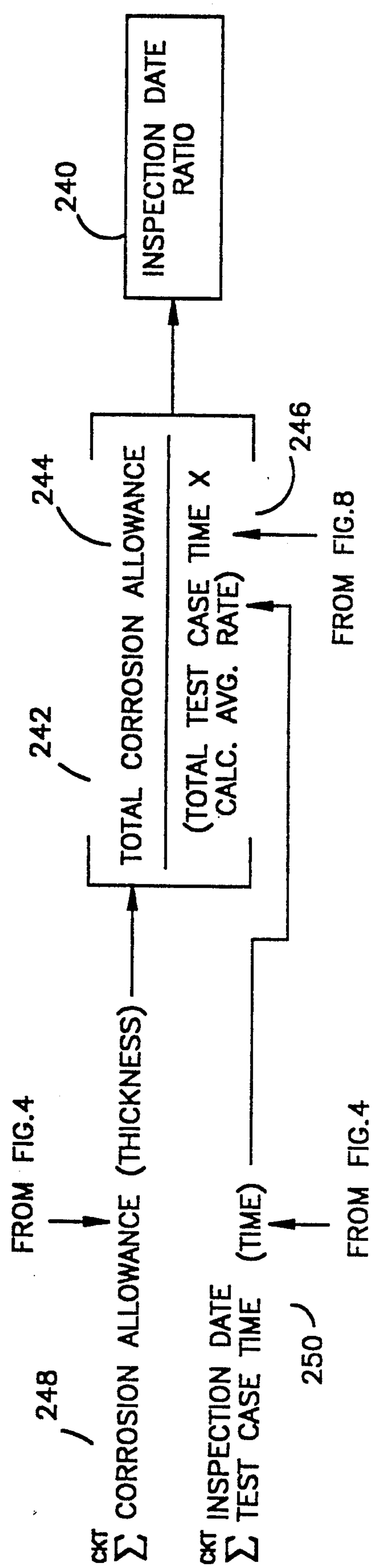
FIG. 10 shows a calculation of the inspection date ratio which is an independent factor useful in evaluating the overall conservatism of the inspection program.

FIGS. 9 and 10 discuss respectively calculation of the retirement date, which is useful in scheduling future maintenance work and the like, and which can provide some additional information above and beyond the inspection date, and of the inspection date ratio, which is useful in determining whether the circuits in the plant are being inspected at appropriate intervals or whether there are, for example, areas that are not being inspected at an appropriate frequency.

F. Calculation of Retirement Date

As shown in FIG. 9, the retirement date 220 is calculated for each inspection point, and relates to an estimated time at which a particular piping element is likely to require replacement. As indicated, the retirement date 220 is the sum of the latest reading date 222, that is, the date on which the pipe was most recently inspected, plus a quantity 219 equal to the latest reading thickness 224, that is, the thickness last measured, less the retirement limit 226, which is calculated in accordance with FIG. 6, divided by the retirement date rate 228. The retirement date rate 228 is the rate of corrosion of the pipe, and as indicated at 230 is the greater of the point long rate and the calculated average rate for the circuit.

G. Calculation of Inspection Date Ratio

FIG. 10 shows calculation of the inspection date ratio 240, which is computed for each circuit, and which provides an indication whether each circuit is being inspected with a frequency commensurate with the degree of risk desired and the corrosion rate experienced therein. The inspection date ratio 240 is as indicated at 242 the result of division of the total corrosion allowance 244 by a quantity 246 equal to the total test case time multiplied by the calculated average rate.

As indicated at 248, the total corrosion allowance 244 is simply the sum over the circuit of all the corrosion allowances, which as noted above are calculated as indicated at 120 (FIG. 4) and which simply represent the estimated thickness at each point less the retirement limit of a particular element of piping. As indicated at 250, the total test case time is simply the sum over the circuit of all the inspection date test case times. The inspection date test case times are calculated as indicated in connection with FIG. 4, that is, are the lesser of the total thickness test case time and the corrosion allowance test case time.

As mentioned, the total test case time 250 is multiplied by the calculated average rate determined according to FIG. 8, as indicated at 246. The result, which is the denominator of the division operation indicated at 242, increases with the calculated average rate, that is, as the rate of corrosion within the circuit increases, or when the test case time increases, that is, when the relative time between inspections is long. Because this quantity is divided into the total corrosion allowance 244, which decreases when the piping within a particular circuit has substantial lifetime remaining before its retirement date, the value of the inspection date ratio 240 is inversely proportional to the relative rate at which the particular circuit needs to be inspected. That is, a low inspection date ratio may indicate that the sample size is too small, or that the circuit is being overinspected relative to circuits whose inspection date ratio is larger. The inspection date ratio thus can be used to evaluate the efficiency of allocation of inspection resources to particular circuits within a particular process plant.

H. Summary of Calculations

As discussed above in connection with FIG. 4, the total thickness test case rate 112, which in effect models corrosion through a pipe wall, is the greatest of the circuit adjusted rate times the circuit safety factor, each of which represents the greatest of three test cases, and the maximum point long rate and the maximum point short rate. Hence, eleven total test cases are effectively evaluated in the determination of the total thickness test case rate 112.

FIG. 5 in turn shows at 136 that the circuit adjusted rate is the greatest of the formula adjusted rate, the suggested circuit rate, and the minimum circuit rate. As indicated at 140, the formula adjusted rate is the calculated average rate for the particular circuit plus a quantity 147 equal to 1.28 times sigma divided by the square root of the number of total points evaluated, all as indicated at 146. The suggested circuit rate 142 is based on the inspector's experience, whereas the minimum circuit rate 144 is from a table intending to ensure that some minimum rate is put into this quantity. The net effect is that a number of individually conservative test case rates are compared to yield a super-conservative rate.

FIG. 7 shows the derivation of the circuit safety factor 160, which as shown at 162 is the greatest of the maximum/average ratio, the suggested safety factor and the risk level safety factor. The maximum/average ratio, as discussed in connection with FIG. 8, provides an indication of the departure of a particular point in the circuit from the average thereof, and thus provides indication that this point may be more likely to fail than other points within the circuit. Again, the suggested safety factor 166 is a result of the inspector's judgment, while the risk level safety factor is calculated in accordance with the remainder of FIG. 7, and thus incorporates such factors as the human hazard posed by the substance being conveyed by the particular circuit, the possibility of autoignition, and the like.

Hence, the circuit adjusted rate and the circuit safety factor are each selected as the greatest of three test cases so a total of nine test cases are evaluated prior to the comparison of the greatest of these to the maximum point long rate and the maximum point short rate in step 114 (FIG. 4), yielding the total thickness test case rate 112. In effect, in each of nine cases a circuit adjusted rate is multiplied times a circuit safety factor to yield a possible total thickness test case rate. Again, the goal is to provide an extremely conservative estimate for the total thickness test case time.

Similarly, the corrosion allowance test case rate, which in effect models the failure of a pipe by splitting or rupturing, that is, due to operating pressure and without corroding through, is the greatest of five individual rates, of these, the circuit adjusted rate is the greatest of three individual rates, as shown at 138. Together, these rates incorporate the inspector's experience (via the suggested circuit rate 142), a default value (the minimum circuit rate 144), and a statistically significant value (the formula adjusted rate 140). These are compared to short and long point rates, and to two different values which are calculated based on the circuit calculated average corrosion rate, and statistically weighted to reflect the variation in the corrosion rates in the circuit.

The net effect is that extremely conservative estimated corrosion rates are used in arriving at the inspection date, whether the total thickness or corrosion allowance cases prevail.

V. Report Generation and Data Processing Refinements

The data generated in accordance with the discussion under IV, "GENERATION OF INDIVIDUAL DATA," above, can be utilized a number of ways, many of which will suggest themselves to those of skill in the art. For example, the data thus generated can be integrated in a conventional personal computer-based database management software program for implementing the pipeline corrosion monitoring system of the invention, for generating graphic reports, for scheduling inspection and replacement of pipes, and the like. Such commercial programs are available from a wide variety of sources. For example, graphics programs are available which readily can convert the inspection date, the long and short point rates, and the like into easy-to-read displays indicating which circuits need prompt inspection and which inspection points are associated with piping elements approaching retirement date, to point out cases where the short rate has substantially changed recently, indicating that some conditions have changed within the circuit, and the like.

Similarly, conventional task scheduling programs can readily be used to allocate resources according to the inspection dates calculated in accordance with FIG. 4.

As noted in detail above, these dates effectively correlate the potential risk caused by failure of a particular pipe within the circuit to the frequency of its inspection and to the safety factors, remaining thickness, and the like. This is performed in essence by comparing the inspection dates for individual points within circuits to the inspection dates for points generated within other circuits. Clearly, if the earliest inspection date calculated for a point within a particular circuit is 15 years later than the earliest inspection date calculated for another circuit, the latter circuit needs to be inspected first. On the other hand, if the maximum/average ratio for the latter circuit is very high, this may be taken to indicate that at least a single inspection point within the latter circuit needs to be inspected; similarly, if sigma is small for the latter circuit and high for the former circuit, this indicates that on balance the former circuit may need to be inspected overall before a complete inspection of the second circuit is performed.

The pipeline corrosion monitoring system of the invention can also be employed in conjunction with a conventional software program designed to draw isometric diagrams such as shown in FIG. 2 to identify the inspection points and to conveniently correlate them with the corresponding calculated inspection dates. Such programs are readily employed to associate individual data items with individual elements on a particular drawing. In this way, the inspector can be provided with a very convenient diagram indicating graphically where on a particular circuit a particular inspection point scheduled for inspection on a certain inspection date is located. Similarly, when updated inspection data later becomes available, the isometric diagrams provide a convenient manner in which to associate, for example, individual piping wall thickness readings with the corresponding inspection point locations. Such use of computer-generated isometric diagrams is much more foolproof and much easier for inspectors to use than would be a system identifying the inspection point by geographical coordinates or by valve number or the like, all of which would be subject to error to some degree.

Therefore, while a preferred embodiment of the invention has been described in detail, the invention should not be limited to the preferred embodiment, which is merely exemplary thereof, but only by the following claims.

What is claimed is:

1. A corrosion monitoring method for monitoring the condition of the walls of corrodible piping and associated vessels in a process plant, comprising the steps of:
 - dividing the piping and associated vessels of the plant into a plurality of circuits, wherein the elements of each of the circuits are expected to be exposed to a common corrosion environment;
 - establishing at least one inspection point within each circuit;
 - assembling corrosion data, said corrosion data comprising actual measurements of the wall thicknesses of the piping and associated vessels at each of the inspection points, said measurements being associated with corresponding times of measurement for each inspection point thus established;
 - determining for each inspection point the highest of several possible corrosion rates which can be expected to occur;
 - establishing a risk-level safety factor for each circuit, said risk-level safety factor being calculated from a plurality of factors comprising:
   - a design pressure for the circuit,
   - a design temperature for the circuit,
   - the degree of hazardousness to humans of the material in the piping and associated vessels of the circuit,
   - the potential of said material to spontaneously ignite in the atmosphere, and
   - the location of the circuit relative to valued property likely to be damaged by a pipe wall failure in said each circuit;
 - calculating inspection dates one for each of the inspection points within each of the circuits from the determined corrosion rates taking into account the risk-level safety factor using a programmed digital computer; and
 - producing an inspection schedule for said piping and associated vessels from the calculated inspection dates.

2. The method of claim 1, wherein the inspection dates are calculated by establishing a plurality of test cases for each circuit, each of said test cases providing an estimate of the potential corrosion rate within each said respective circuit based on a particular potential corrosion mechanism model.

3. The method of claim 2, wherein certain ones of said test cases are based on corrosion mechanisms which tend to corrode an entire section of a pipe or associated vessel, and wherein others of said test cases are based on corrosion mechanisms tending to corrode specified points within a pipe or associated vessel.

4. The method of claim 1, comprising comparing any differences between individual corrosion rates measured at individual inspection points in a circuit and the circuit average corrosion rate for that circuit to locate any inspection points within that circuit having corrosion rates that differ from the circuit average rate by more than a predetermined amount and calculating a ratio of the individual corrosion rate to the circuit average rate for use in calculating the inspection dates.

5. A method of monitoring corrosion in a piping system, comprising:
 - dividing a piping system to be monitored into a plurality of circuits, each circuit having a common corrosion environment; designating at least one inspection point within each of the circuits;
 - assembling historical data for piping wall corrosion in the vicinity of the inspection points;
 - inspecting the piping wall thickness at selected inspection points within said circuits to determine the amount of actual corrosion at said points;
 - comparing the actual corrosion at the individual points within each of the circuits at which said inspections have been made to corrosion estimated from rates based on said historical data;
 - calculating, based on the corrosion at the inspected points and the historical data, estimated corrosion rates for inspection points within each of the circuits at which piping has not been inspected, wherein each of said estimates is selected as the maximum corrosion computed by a plurality of test cases, each test case employing a particular corrosion mechanism mode, said test cases including a model for corrosion of a pipe over a large area, such that said pipe tends to split open or collapse in service before corroding through a wall, and a model for corrosion of said pipe in a localized area, such that the pipe leaks prior to collapse thereof, said localized corrosion model incorporating a risk-level safety factor calculated from a plurality of factor comprising:

a design pressure for the circuit, a design temperature for the circuit, the degree of hazardousness to humans of the material in the circuit, the potential of said material to spontaneously ignite in the atmosphere, and the location of the circuit relative to valued property that may be damaged by a leak;

calculating inspection dates one for each of the inspection points within each of the circuits based on the estimated corrosion rates using a programmed digital computer, and producing an inspection schedule using the calculated inspection dates.

6. The method of claim 5, comprising updating said historical data with additional inspection data as additional inspections are carried out.

7. The method of claim 5, wherein for each circuit a maximum corrosion rate, determined from a single inspection point within said circuit, is divided by the average corrosion rate, determined from all inspection points within said circuit, to calculate a maximum/average corrosion ration for assessing the likelihood of a piping wall failure within said circuit, and wherein said maximum/average corrosion ration is used calculating the inspection dates.

8. The method of claim 7, wherein one of said test cases uses a localized corrosion model in which a total thickness test case rate is calculated form a circuit adjusted rate and a circuit safety factor, where the circuit adjusted rate is the greatest of a formula adjusted rate, a suggested circuit rate, and a minimum circuit rate, and the circuit safety factor is the greatest of the maximum/average ratio, a suggested safety factor, and the risk-level safety factor.

9. The method of claim 5, wherein one of said test cases uses a large area corrosion model in which a corrosion rate is assumed to be equal to two standard deviations above the calculated average corrosion rate in the circuit.

10. The method of claim 5, wherein one of said test cases uses a large area corrosion model in which a corrosion rate is assumed to be equal to twice the calculated average corrosion rate in the circuit.

11. The method of claim 5, wherein the estimated corrosion rates are calculated two times, the calculations from the first time being used to calculate the estimated corrosion rates the second time, and wherein the corrosion rates calculated the second time are used to calculate the inspection date.

12. In a corrosion monitoring method for monitoring the condition of the walls of corrodible piping and associated vessels in a process plant, including the steps of dividing the piping and associated vessels of the plant into a plurality of circuits, establishing at least one inspection point within each circuit, assembling corrosion data including actual measurements of the wall thicknesses of the piping and associated vessels at the inspection points, determining for each inspection point the highest of several possible corrosion rates which can be expected to occur, calculating inspection dates one for each of the inspection points within each of the circuits from the determined corrosion rates taking into account a risk-level safety factor using a programmed digital computer, and producing an inspection schedule for the piping and associated vessels from the calculated inspection dates, the improvement comprising:

establishing the risk-level safety factor for each circuit by calculating said risk-level safety factor from a plurality of factors comprising:

a design pressure for the circuit, a design temperature for the circuit, the degree of hazardousness to humans of the material in the piping and associated vessels of the circuit, the potential of said material to spontaneously ignite in the atmosphere, and the location of the circuit relative to valued property likely to be damaged by a pipe wall failure in said each circuit.

13. The improvement of claim 12, wherein the inspection dates are calculated by establishing a plurality of test cases for each circuit, each of said test cases providing an estimate of the potential corrosion rate within each said respective circuit based on a particular potential corrosion mechanism model.

14. The improvement of claim 13, wherein certain ones of said test cases are based on corrosion mechanisms which tend to corrode an entire section of a pipe or associated vessel, and wherein others of said test cases are based on corrosion mechanisms tending to corrode specified points within a pipe or associated vessel.

15. The improvement of claim 12, comprising comparing any differences between individual corrosion rates measured at individual inspection points in a circuit and the circuit average corrosion rate for that circuit to locate any inspection points within that circuit having corrosion rates that differ from the circuit average rate by more than a predetermined amount and calculating a ratio of the individual corrosion rate to the circuit average rate for use as one of the plurality of factors in establishing the risk-level safety factor.

* * * * *